Patented Jan. 7, 1930

1,742,506

UNITED STATES PATENT OFFICE

CLARENCE I. B. HENNING AND CHARLES E. BURKE, OF WILMINGTON, DELAWARE, AND EBENEZER EMMET REID, OF BALTIMORE, MARYLAND, ASSIGNORS TO E. I. DU PONT DE NEMOURS & COMPANY, OF WILMINGTON, DELAWARE, A CORPORATION OF DELAWARE

METAL SALTS OF PHTHALIC ESTERS

No Drawing.   Application filed September 24, 1924.   Serial No. 739,689.

This invention relates to new compositions of matter comprising heavy metal salts of a mono-alkyl or mono-aryl ester of phthalic acid. These new salts are characterized by containing the following atomic grouping:

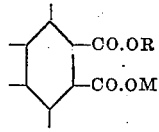

the neutral salts having the following general graphical formula:

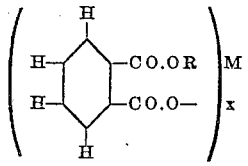

where R represents an alkyl or aryl radical preferably not containing more than one ring of carbon atoms such, for example, as methyl ($CH_3-$), ethyl ($C_2H_5-$), cyclo-hexyl ($C_6H_{11}-$), benzyl ($C_7H_7-$), phenyl ($C_6H_5-$), etc.; M represents the radical of a heavy metal such as iron, zinc, manganese, etc.; and $x$ stands for the number of effective valencies of said metal.

By the expression "heavy metal" we mean to include, in addition to the metals mentioned above, copper, tin, lead, mercury, nickel, cobalt, silver, gold, and platinum.

Compounds of this general type may be readily prepared by intimately mixing an aqueous solution of the sodium salt of the mono-alkyl phthalic acid with a solution of a soluble salt of a corresponding heavy metal, in which case the metal phthalic ester precipitates and can be separated from the supernatant liquid. If desired the compounds so prepared can be further purified by dissolving in ether, filtering any insoluble residue and then distilling off the ether.

The ferrous and ferric neutral salts of the mono-alkyl esters of phthalic acid (such as the salts of the n-butyl ester) are brownish red compounds; the corresponding zinc, mercurous, mercuric, plumbous, and stannous salts are colorless; the corresponding manganous and nickel(ous) salts are greenish; and the corresponding cobaltous and cupric salts are blue. All these salts exist, at least initially, in the form of viscous oils, except the manganese and copper salts, which are crystalline at ordinary room temperatures. The ferric and mercuric salts are somewhat unstable, and the plumbous and stannous salts are also unstable at ordinary temperatures in the presence of water. The zinc salt is unstable at temperatures above 100° C.

The colors of the iron, cobalt, and nickel salts of the mono-alkyl esters of phthalic acid, and the colors of films, such as nitrocellulose films, containing these salts, are remarkably fast to both visible and ultra-violet light.

We have discovered that compounds of this type are soluble in many organic solvents such as ether and acetone, and render available an excellent method of intimately incorporating compounds containing the heavy metals with other organic substances where they may function, for example as drying agents in paints and varnishes, or as catalytic agents in the carrying out of other chemical reactions, as for example, hydrogenation.

Furthermore, we have also discovered that substances of this type form colloids with nitrocellulose and are, therefore, particularly adapted for use in cases where it is desirable to intimately incorporate a metal-containing compound with nitrocellulose.

As an example of the use according to our invention of one of the above-mentioned organo-metallic compounds, a nitrocellulose film of the following composition might be cited:

Pyroxylin _____ 10 parts
Zinc n-butyl phthalate _____ 5 parts
Volatile solvent _____ as required The pyroxylin and zinc butyl phthalate are colloided in the same way that pyroxylin and camphor would be, and the volatile solvent added to give the required consistency. Films prepared in this way are found to be uniform, transparent and possess other qualities which make them satisfactory for many purposes.

As an example of the use of one of these organo-metallic compounds as a drier in varnish, the following example might be given:

| | |
|---|---|
| Chinawood oil | 50 gal. |
| Linseed oil | 12.5 gal. |
| Rosin | 120 lbs. |
| Turpentine | 125 gal. |
| Cobalt butyl phthalate | 1.22 lbs. |

The cobalt butyl phthalate, being very soluble in turpentine and oil, is very readily incorporated in the mixture; and varnish so prepared is found to have satisfactory drying qualities.

We claim:

1. A new composition of matter comprising a heavy metal salt of a mono-alkyl ester of phthalic acid.

2. A composition comprising a compound whose molecules contain the following atomic grouping:

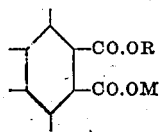

where R represents an organic radical not containing more than one ring of carbon atoms, and M represents a heavy metal radical.

3. A composition as defined in claim 2 in which R represents an organic radical having from 1 to 7 carbon atoms.

4. A composition as defined in claim 2 in which R represents an organic radical having from 2 to 5 carbon atoms.

5. A composition comprising a compound having the following general formula:

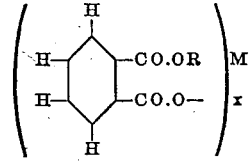

where R represents an organic radical not containing more than one ring of carbon atoms, M represents the radical of a heavy metal, and $x$ stands for the number of effective valencies of said metal.

6. A composition as defined in claim 5 in which R represents an alkyl radical having from 1 to 7 carbon atoms.

7. A heavy metal salt of a mono-alkyl ester of a polybasic acid, which salt is soluble in acetone.

8. A heavy metal salt of a mono-alkyl ester of phthalic acid, which salt is soluble in acetone.

9. A heavy metal salt of a mono-alkyl ester of phthalic acid, which salt is soluble in ether and acetone, and is a colloiding agent for nitrocellulose.

10. As a new article of manufacture, a polyvalent metallic salt of an alkyl half ester of phthalic acid.

11. As a new article of manufacture, a polyvalent metallic salt of the butyl half ester of phthalic acid.

12. As a new article of manufacture, the zinc salt of the butyl half ester of phthalic acid.

13. A process for the production of a polyvalent metallic salt of a half alkyl ester of phthalic acid which consists in reacting a solution of a polyvalent metallic salt with a solution of sodium alkyl phthalate.

14. A process for the production of a polyvalent metallic salt of monobutyl phthalate which consists in reacting a solution of a polyvalent metallic salt with a solution of sodium butyl phthalate.

In testimony whereof we affix our signatures.

CLARENCE I. B. HENNING.
CHARLES E. BURKE.
EBENEZER EMMET REID.